Dec. 16, 1958 C. C. LANE ET AL 2,864,206
METHOD AND APPARATUS FOR SHARPENING SCRIBER POINTS
Filed March 1, 1957 2 Sheets-Sheet 1

INVENTORS
CHARLES C. LANE
WILLIAM C. MAHONEY
BY
ATTORNEYS

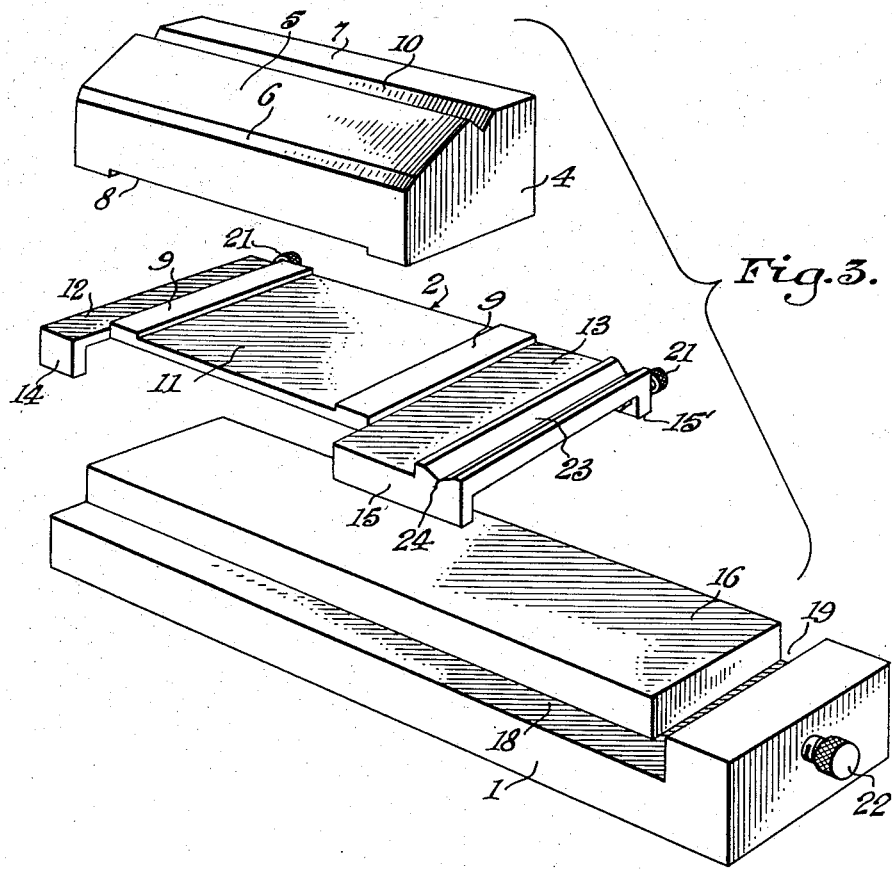

United States Patent Office 2,864,206
Patented Dec. 16, 1958

2,864,206

METHOD AND APPARATUS FOR SHARPENING SCRIBER POINTS

Charles C. Lane, Alexandria, Va., and William C. Mahoney, Columbus, Ohio

Application March 1, 1957, Serial No. 643,486

4 Claims. (Cl. 51—157)

(Granted under Title 35, U. S. Code (1952), sec. 266)

The invention described herein may be manufactured and used by or for the Government for governmental purposes without the payment of any royalty thereon.

This invention relates to sharpening devices and more particularly to sharpening jigs for grinding the required angles into the points of scribing tools. The particular angle and configuration of the point of a scribing tool is especially important in the cartographer's art.

One of the most serious bottlenecks to overcome in map production has been the color separation of final map manuscripts. Ink drafting has failed to keep pace with the increased speed of modern map compilation techniques and equipment. Processes which permit reducing the present ink drafting techniques to a simple tracing operation involve the use of glass plates and plastic materials as bases for coating materials upon which the desired linework is scribed. In carrying out the linework by scribing on the plastic material, which is preferable to glass, it was found that the scribing points had a pronounced tendency to bite into and jam in the plastic base material unless extreme caution was used. The tendency became more difficult to control when different types of scribers were used, i. e. rigid and swivel, because pressure on the point varied depending on the direction of travel when using the former type scriber.

It was noted while making swivel scribing points that occasionally the hit-or-miss method of sharpening resulted in a scribing point that did not shear or jam in a vinyl plastic base even under a wide variation of pressure. Tests were conducted to determine the optimum sharpening angle of the scribing point. The geometry of the scribing point was varied and scribing operations conducted on coated vinyl plastic under different loadings. It was found that the controlling feature which raised or lowered the jamming pressure, that pressure at which the point breaks into the plastic and no longer scribes a smooth line, was the angle of attack of the forward face of the scribing edge. As this angle was decreased, the pressure at which the scribing point jammed became higher. However, decreasing the angle also raised the minimum pressure which was required to scribe a clean sharp line on the coated material, and reduced the operator's visibility of the line being traced. The optimum angle of attack was therefore defined as the greatest angle that would give a high jamming pressure and good visibility and still provide the greatest spread between the minimum pressure and the jamming pressure. This angle was about 51 degrees for work on vinyl plastics. Experiments on plastics other than vinyl have indicated the optimum angle will be different depending upon the plasticity, modulus of elasticity, and ultimate strength of the material.

The minimum scribing point pressure to scribe a clean, sharp line is dependent upon four factors:

(1) The plasticity of the coating at various temperatures;

(2) The load strength between coating and base plastic at various temperatures;

(3) The thickness of the coating; and (4) The sharpness of the scribing edge of the scribing point.

In general application, the most important of these factors is the sharpness of the scribing point. Best results were attained using a tool whose scribing edges had a finish at least equal to that attained by honing on an Arkansas stone. Rough grinding and shaping of scribing points is accomplished on an India stone. The sharpened points are honed on an Arkansas stone. In connection with sharpening, it was also found that if the attacking face of the point was not honed, the jamming pressure would be lowered due to the greater stresses induced in the base plastic by the higher friction developed between the rougher bottom and attacking face of the tool against the base plastic.

Plastic scribing operations require the use of rigid and swivel scribing points. Such points have a variety of configurations for independently performing scribing operations or for use in conjunction with templates to scribe symbols representing information shown on maps. For example, rigid scribing points may be round, square, triangular, and chisel, while swivel scribing points may be for single line, double line narrow, double line wide, and triple line. In order that scribing operations on vinyl plastic may be successfully carried out, it is essential that the scriber points be maintained in a sharpened condition and at the required angles for the various point configurations.

It is therefore a principal object of the present invention to provide a sharpening assembly which will facilitate the recovery of the required angles and the geometric design of the points of plastic scribing tools.

It is a further object of the present invention to provide an assembly for sharpening scriber points which permits a range of angles to be ground into the scriber points.

It is a further object of the present invention to provide an assembly for sharpening scriber points which includes interchangeable sharpening jigs to cover a range of angles for such points.

It is a further object of the present invention to provide an assembly for sharpening scriber points including interchangeable sharpening jigs upon which scribing tools carrying scribing points may be mounted for grinding the points at angles determined by the interchangeable sharpening jig.

It is a further object of the present invention to provide an assembly for sharpening scriber points to accommodate both rigid and swivel type scribers.

It is a further object of the present invention to provide an assembly for sharpening scriber points including interchangeable sharpening jigs having surfaces of predetermined inclination to accurately control the angles of sharpened surfaces of scriber points.

It is a further object of the instant invention to provide an assembly including interchangeable sharpening jigs having surfaces of predetermined inclination for mounting scriber tools carrying scriber points at an angle determined by the inclined surface of the sharpening jig and coacting therewith to control the angle of sharpening of the scriber point.

It is also an object of the present invention to provide an assembly for sharpening scriber points including interchangeable sharpening jigs having surfaces of predetermined inclination and accommodating interchangeable sharpening materials of varying degree to obtain a variety of angles for scribing points from blank and sharpened stock to permit economy of scribing points required in scribing operations.

These and other objects will become apparent from the subsequent description in which:

Fig. 3 is an exploded view of the preferred form of the invention shown in Fig. 1; and Fig. 4 is a transverse sectional view similar to Fig. 2 but with another jig in position for sharpening a different angle on a scriber point.

Figure 1:
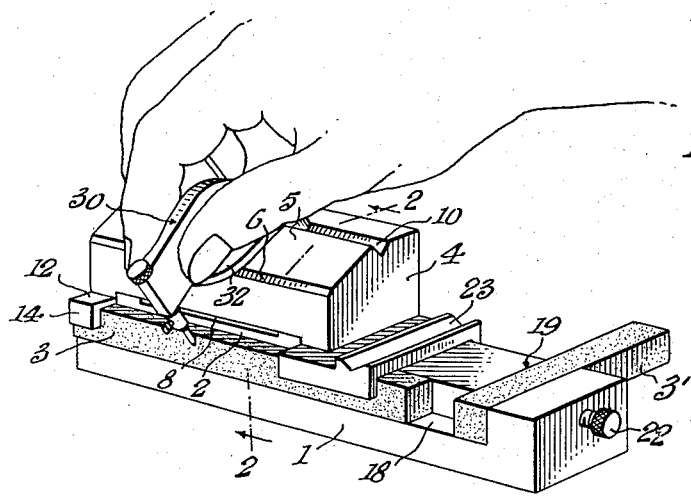
Fig. 1 is a perspective view of a preferred form of the invention with a scribing tool in position on a jig for sharpening the scriber point to a predetermined angle.
Figure 2:
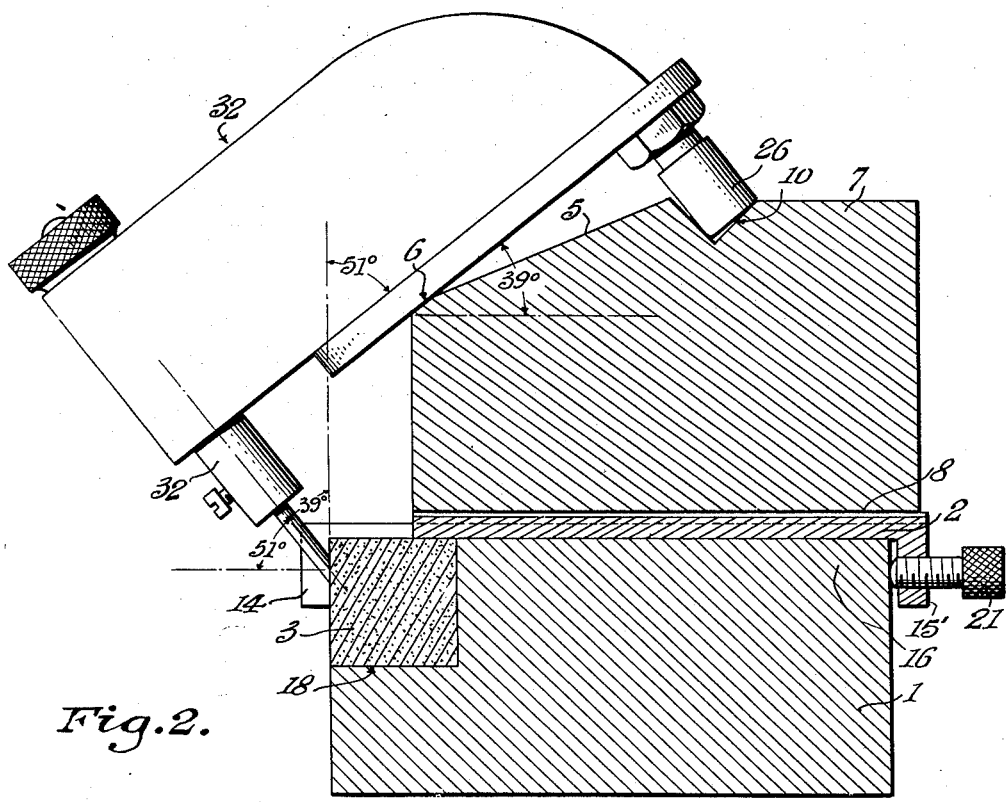
Fig. 2 is a transverse sectional view taken on the line 2—2 of Fig. 1.

Reference is made to Fig. 1 showing the components of a preferred form of scriber point sharpening jig in assembled condition with a scriber held in position preparatory to sharpening the scriber point. The jig assembly includes a stone fixture jig 1, a base plate 2, sharpening stones 3 and 3' and a sharpening jig 4 demountably carried on the base plate 2. The configuration of the individual components and their interrelation is more clearly shown in Fig. 3. One form of sharpening jig used in the assembly and shown in Figs. 1, 2, and 3, has a sloping face 5 terminating in a beveled edge 6 which may have varying degrees of inclination with the horizontal depending upon the desired angle of the scriber point. The angle that the beveled edge 6 makes with the horizontal is equal to the angle that the longitudinal axis through the scriber point makes with the vertical, or it is also the complement of the angle that the longitudinal axis of the scriber point makes with the horizontal as shown in Fig. 2. A 90° notch 10 extending lengthwise of the sharpening jig 4 adjoins the upper edge of the sloping face 5 and lies between the sloping face 5 and a horizontal surface 7. The angle with the horizontal of the sloping face 5 is determined by the geometry of the notch 10 and the beveled edge 6. A portion of the lower surface of the sharpening jig 4 is recessed as at 8. The recessed portion is dimensioned to engage raised hardened portions 9 formed integral with the base plate 2 to prevent sidewise movement of the sharpening jig 4 when a scriber point is being re-sharpened or ground. The beveled edge 6 of the sharpening jig 4 used in the assembly as shown in Figs. 1, 2, and 3, to resharpen or grind a scriber point having an upwardly sloping face in the scribing direction at an angle of 51° with the horizontal, must have an angle of 39° with the horizontal as shown in Fig. 2. The structure of sharpening jigs for re-sharpening or grinding other angles on scriber points such as 0°, 3° and 80° will be hereinafter described. Any appropriate material may be used for the sharpening jig 4, but stainless steel or aluminum are preferred.

The base plate 2 is an integral structure formed with a central section 11 which is of lesser width than the adjoining sections 12 and 13. The central section 11 has raised, spaced, and hardened portions 9, previously mentioned, which are parallel and extend transversely of the central section 11 and adjacent the boundaries of the central section 11 and the adjoining sections 12 and 13. The section 12 is provided with a narrow flange 14, and the section 13 is provided with a wide flange 15 at the forward edge and a continuous flange 15' at the rear edge. The inside clearance between the flanges 14, 15, and 15' is dimensioned to be greater than the width of the raised portion 16 of the stone fixture jig 1. Thus, when the base plate 2 is in assembled position on the stone fixture jig 1, flange 15' is adjacent one long edge of the raised portion 16 and the flanges 14 and 15 overlap and engage a sharpening stone 3 which is mounted in a notch 18 along one long edge of the stone fixture jig 1. A transverse notch 19, located adjacent one end of the stone fixture jig 1 in which another sharpening stone 3' is mounted, intersects at right angles the notch 18. These notches may be dimensioned to accommodate different sizes of sharpening stones, and the size used in models built for test purposes were one-half inch square. The flange 15' is provided with adjusting screws 21, which when tightened to clamp the base plate 2 in assembled position on the stone fixture jig 1, rigidly secures the sharpening stone 3 in the assembly. An adjusting screw 22 carried in a tapped hole in one end of the stone fixture jig 1 can project into the notch 19 to rigidly secure the sharpening stone 3' in fixed position.

Section 13 of the base plate 2 has integrally formed therewith a V-shaped notch 23 which, as will be explained, provides a jig for resharpening or grinding scriber points to 3°. Instead of providing a bevelled edge such as 6 on the sharpening jig 4 as in Figs. 1, 2, and 3, the proper inclination of the scriber tool to resharpen or grind a small angle, for example 3°, on the scriber point is obtained by elevating the apex 24 of the V-shaped notch 23 above the level of the surface of the section 13 a sufficient distance to produce the necessary tilting of the scriber too to grind or resharpen the scriber point to the required angle.

If it is required to resharpen or grind a scriber point to zero degrees, the scriber tool shown generally by 30 is set upon the stone fixture jig 1 with the legs 26 in contact with the raised portion 16 which is flush with the top of the sharpening stones 3 and 3'. In this position sliding motion of the scriber tool will resharpen or grind the scriber point to zero degrees.

Fig. 4 shows a central vertical section through a sharpening jig 28 taken in the same manner as the jig 4 in Fig. 2 and configured to permit grinding or resharpening a scriber point having an upwardly sloping face of 80° with the horizontal. Jig 28 is mounted on the base plate 2 in the same manner as the 51° jig 4 previously described. The jig 28 has a 120° notch 29 in which the legs 26 of the scriber tool 30 slide during a sharpening or grinding operation. The inclined surface 31 of the jig 28 makes an angle of 10° with the horizontal and when the scriber tool base plate 25 is in contact with the inclined surface 31 and the legs 26 are positioned in the notch 29 as shown in Fig. 4, permits an 80° angle to be ground or sharpened on a scriber point when the scriber tool is moved sidewise in this position.

While sharpening jigs for 0°, 3°, 51° and 80° have been described, the invention is not limited to these angles. It is only necessary to provide a jig having an inclined surface to contact the base plate 25 of the scriber tool 30, which is inclined to the horizontal at an angle which is the complement of the desired angle of the scriber point.

Both rigid and swivel type points may be sharpened and ground on the instant device. Rigid point blanks are ground into round points, square points, triangle points and chisel points and the swivel points will consist of single-line points, double-line narrow points, double-line wide points and triple-line points. The rigid round point and the swivel points are intended for scribing continuous linework. The rigid square, triangle and chisel points are used as special points for the scribing of ticks, dashes, buildings, triangles, crosses and circular dots. These points may be quickly and easily sharpened from five basic forms using the sharpening jig. These basic forms are rigid point blank, swivel single-line blank, swivel double-line wide point, swivel double-line narrow point and swivel triple-line point. The rigid round point which is the simplest to sharpen, is used to accomplish 90 percent of the line work on the average topographic map. The remaining 10 percent is accomplished with all other varieties of points.

The manner in which the jig is used will now be described with reference to a few of the types of scriber points mentioned heretofore.

The rigid round point, which is the easiest type of point to sharpen, is inserted into the chuck 32 of a correctly levelled scribing tool and grinding a 0° flat by resting the legs 26 of the scriber tool 30 on the raised portion 16 of the stone fixture jig 1 using the Arkansas stone which may be either 3 or 3', depending on where the stone used for honing is located in the jig. The grinding or sharpening is done by sliding the scribing tool back and forth and pressing the scriber point downward onto the Arkansas stone very lightly until the flat which produces the desired line weight is reached.

The rigid square point is ground and sharpened to obtain four scribing edges at right angles to each other on the base of the point. First, a rigid point is inserted in the chuck 32 of the scribing tool 30 and tightened so that the top of the rigid point blank extends about ⅛ inch below the top of the sharpening stone in the stone fixture jig 1 when the tool is resting on the 51° jig as shown in Fig. 2. The chuck 32, which may be rotated through 0, 90, 180, and 270 degrees, thereby also rotating the scriber point therein through the same degrees, is set at 0° graduation and the first 51° face is ground on the India or coarse stone, which may be either 3 or 3'. The next step is to grind a 51° face with the chuck 32 set at 180°. At the completion of this operation, a chisel point is formed whose edge should fall in the centerline of the scriber point. A 51° face is then ground with the chuck 32 set at 90°, care being taken that the chisel point is reduced no more than half its width. Finally, a 51° face is ground with the chuck 32 set at 270° until the tip of the scribing point is a perfect four-sided pyramid point. All the faces are then honed on the Arkansas stone. After the point has been honed, the scriber tool is levelled and a flat is ground on the point in the same manner as a rigid round point, heretofore described, being careful not to over-grind the point.

The rigid triangle point is ground in the same manner as the rigid square point, with the exception that the 51° faces are ground and honed with the chuck 32 set at 0, 120 and 240 degrees. After grinding of the faces, an equilateral three-sided pyramid is formed at the point. The scriber tool is levelled and the point ground and honed to a flat to the desired dimension in the manner heretofore described for the rigid round point.

To sharpen the single line swivel point, the scriber tool 30 and scriber point held in the chuck 32 thereof are levelled. Then a 3° flat is ground and honed using the 3° jig which includes the V-notch 23 as shown in Fig. 3 with the chuck 32 set at 0°. Obviously, the 51° jig 4 must be removed from the base plate 2 when the 3° jig is used for grinding or sharpening scriber points. Next a 51° face is ground and honed, using the 51° jig 4, with the chuck 32 set at 0. The scriber point is reduced in width using the 80° jig 28, as shown in Fig. 4, by grinding and honing the sides of the point with the chuck 32 set at 90° and 270°. Finally, the rear face of the point is ground to reduce the length of the bottom flat until it is about equal to the width of the point. For this operation, the chuck 32 is set at 180° and the 80° jig 28 is used.

The swivel double and triple line points are ground by the same method used for swivel single line points. More care must be used, however, to grind and hone the two outside points to the correct dimension. In triple line points, the center point is designed so that it will always scribe a particular line weight until the point is rendered useless by excessive wear and grinding. Therefore, the center point requires no consideration in the sharpening procedure.

Having thus described our invention and the manner of using the novel sharpening device, what we desire to claim and secure by United States Letters Patent is:

1. A sharpening and grinding device for scribing tool points comprising, in combination, a base member carrying a sharpening stone, a sharpening jig including depending flanges supported by said base member and embodying guide means having a predetermined angle of inclination and means for supporting a scriber point secured in a scriber tool thereon in a predetermined angular position in contact with said sharpening means, said angle of inclination being complementary to the angle between the scriber point and said sharpening means, clamping means on said sharpening jig cooperating with said depending flanges for simultaneously releasably securing said sharpening jig and the said sharpening stone to said base member whereby a scriber point carried in a scriber tool supported in said sharpening jig may be sharpened.

2. A sharpening and grinding device for scribing tool points comprising, in combination, a base member having a slot therein, a sharpening stone carried in said slot, a sharpening jig including depending flanges supported by said base member and embodying guide means having a predetermined angle of inclination and means for supporting a scriber point secured in a scriber tool thereon in a predetermined angular position, the said guide means comprising a V-shaped notch wherein the apex of said notch is elevated above the level of an adjacent planar portion of said sharpening jig, the scriber point being in contact with the sharpening stone, and clamping means on said sharpening jig cooperating with said depending flanges for releasably securing said sharpening jig to said base member.

3. A device as recited in claim 2 wherein said guide means extend normal to the length of said sharpening jig and define one bounding edge thereof.

4. A device as recited in claim 2 wherein the means for supporting a scriber tool on said sharpening jig comprises a notch remote from said guide means and parallel thereto for retaining the point of a scriber tool in contact with a surface of said sharpening means at an angle determined by the angle of inclination of said guide means.

References Cited in the file of this patent

UNITED STATES PATENTS

| | | |
|---|---|---|
| 223,315 | Bower | Jan. 6, 1880 |
| 870,365 | Hight | Nov. 5, 1907 |
| 1,675,981 | Lees | July 3, 1928 |